US009191542B2

(12) United States Patent
Urita et al.

(10) Patent No.: US 9,191,542 B2
(45) Date of Patent: Nov. 17, 2015

(54) IMAGE READING APPARATUS AND IMAGE FORMING APPARATUS PROVIDED WITH THE SAME

(71) Applicant: CANON FINETECH INC., Misato-shi, Saitama-ken (JP)

(72) Inventors: Akira Urita, Tsukubamirai (JP); Takeshi Sasaki, Tsukuba (JP)

(73) Assignee: CANON FINETECH INC., Saitama-Ken (JP)

( * ) Notice: Subject to any disclaimer, the term of this patent is extended or adjusted under 35 U.S.C. 154(b) by 0 days.

(21) Appl. No.: 14/523,622

(22) Filed: Oct. 24, 2014

(65) Prior Publication Data

US 2015/0116796 A1    Apr. 30, 2015

(30) Foreign Application Priority Data

Oct. 31, 2013   (JP) .................. 2013-227763

(51) Int. Cl.
*H04N 1/04*  (2006.01)
*H04N 1/10*  (2006.01)
*H04N 1/00*  (2006.01)

(52) U.S. Cl.
CPC ............. *H04N 1/10* (2013.01); *H04N 1/00551* (2013.01); *H04N 2201/0081* (2013.01); *H04N 2201/02497* (2013.01); *H04N 2201/0422* (2013.01)

(58) Field of Classification Search
CPC ................ H04N 1/00551; H04N 1/10; H04N 2201/0081; H04N 2201/02497; H04N 2201/0422
USPC .................................. 358/497, 474, 498, 496
See application file for complete search history.

(56) References Cited

U.S. PATENT DOCUMENTS

| 5,633,782 | A  | * | 5/1997 | Goodman et al. ........ 361/679.41 |
| 7,804,628 | B2 | * | 9/2010 | Hashimoto ........ H04N 1/00543 358/400 |
| 2007/0201109 | A1 | * | 8/2007 | Osakabe et al. .............. 358/474 |
| 2011/0075232 | A1 |   | 3/2011 | Nakahara ...................... 358/498 |

FOREIGN PATENT DOCUMENTS

JP       2011-075859       4/2011

* cited by examiner

*Primary Examiner* — Houshang Safaipour
(74) *Attorney, Agent, or Firm* — Fitzpatrick, Cella, Harper & Scinto

(57) ABSTRACT

An image reading apparatus, including: an image reading unit configured to read an image of a document placed on a document placing portion; a document pressure unit configured to press the document placed on the document placing portion against the document placing portion; a first holding unit configured to hold the document pressure unit so that the document pressure unit is openable and closable with respect to the document placing portion with a shaft pivotally supporting the document pressure unit; and a second holding unit configured to hold the document pressure unit so that the document pressure unit is openable and closable with respect to the document placing portion without a shaft pivotally supporting the document pressure unit.

14 Claims, 10 Drawing Sheets

IMAGE READING APPARATUS AND IMAGE FORMING APPARATUS PROVIDED WITH THE SAME

BACKGROUND OF THE INVENTION

1. Field of the Invention

The present invention relates to an image reading apparatus configured to read an image of a document, and to an image forming apparatus provided with the image reading apparatus and configured to form an image read by the image reading apparatus on a sheet.

2. Description of the Related Art

Hitherto, there has been provided an image forming apparatus having an apparatus main body including an image reading apparatus configured to read an image of a document, and being configured to form the image read by the image reading apparatus on a sheet (Japanese Patent Application Laid-Open No. 2011-75859). The image reading apparatus includes an image reading unit configured to read the image of the document placed on a document placing portion, and a document pressure unit configured to press the document placed on the document placing portion against the document placing portion. Examples of the document pressure unit include an auto document feeder configured to automatically feed documents to the image reading unit, and a flat-plate-shaped opening and closing cover.

Incidentally, the document pressure unit is coupled to the image reading unit by hinges (opening and closing hinges) so as to pivot to open and close the document placing portion of the image reading unit. In this case, in order to make the image reading unit reliably support the document pressure unit, at least one pair of the hinges is provided on the image reading unit.

However, the plurality of hinges used in the related-art image reading apparatus pose a problem of structural complexity.

SUMMARY OF THE INVENTION

The present invention provides an image reading apparatus having a document pressure unit pivotally provided on an image reading unit by a first holding unit configured to pivotally support the document pressure unit on the image reading unit and a second holding unit configured to hold the document pressure unit on the image reading unit without pivotally supporting the document pressure unit. The present invention also provides an image forming apparatus including the image reading apparatus.

According to an embodiment of the present invention, there is provided an image reading apparatus, comprising: an image reading unit configured to read an image of a document placed on a document placing portion; a document pressure unit configured to press the document placed on the document placing portion against the document placing portion; a first holding unit configured to hold the document pressure unit so that the document pressure unit is openable and closable with respect to the document placing portion with a shaft pivotally supporting the document pressure unit; and a second holding unit configured to hold the document pressure unit so that the document pressure unit is openable and closable with respect to the document placing portion without a shaft pivotally supporting the document pressure unit.

According to an embodiment of the present invention, there is provided an image forming apparatus, including: the image reading apparatus described above; and an image forming unit configured to form an image read by the image reading device on a sheet.

Further features of the present invention will become apparent from the following description of exemplary embodiments with reference to the attached drawings.

DESCRIPTION OF THE EMBODIMENTS

Now, an image reading apparatus according to embodiments of the present invention, and an image forming apparatus having an apparatus main body provided with the image reading apparatus will be described with reference to the accompanying drawings.

(Image Forming Apparatus)

Figure 1:
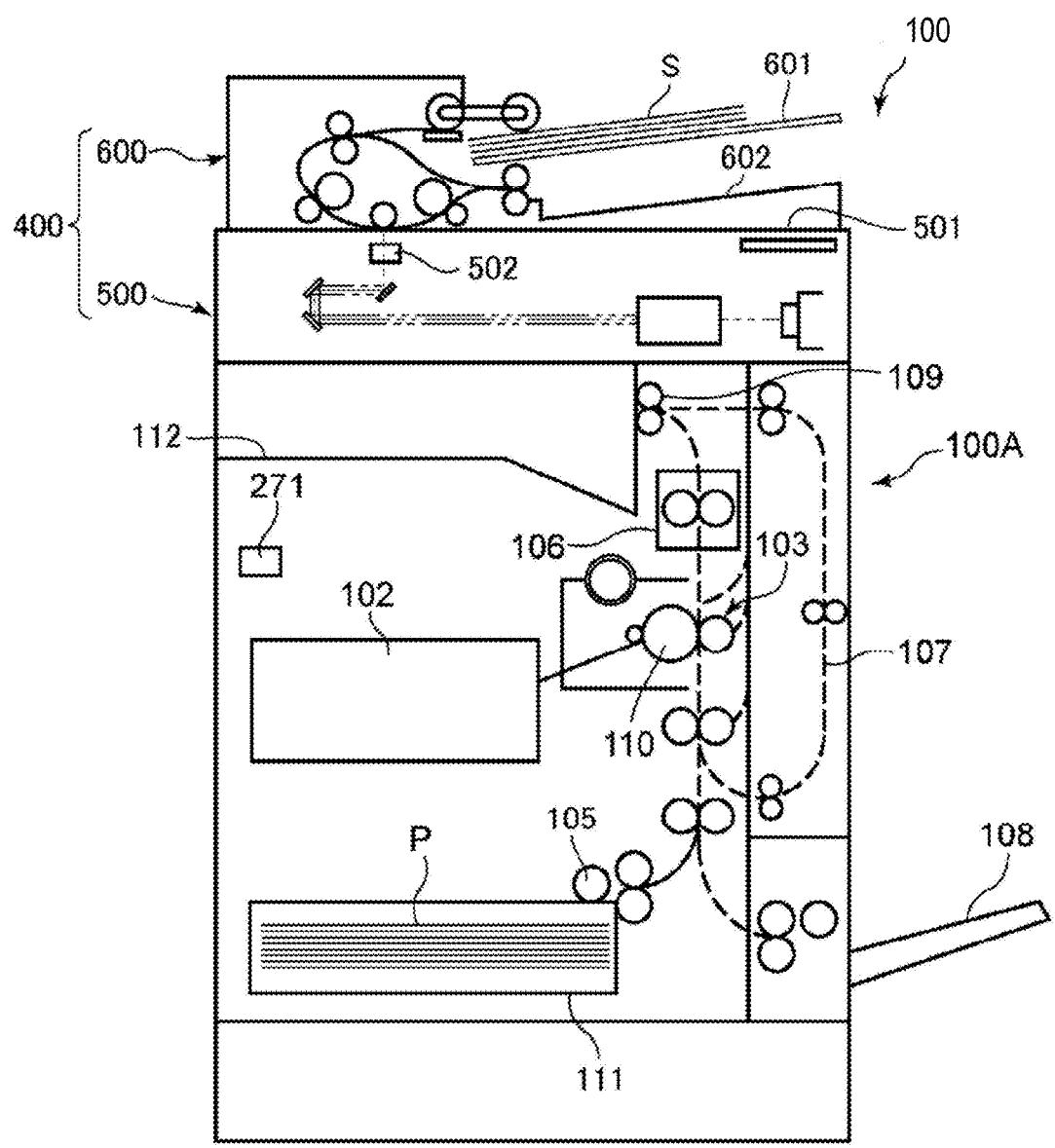
FIG. 1 is a schematic sectional view of an image forming apparatus according to an embodiment, which is taken along a sheet conveying direction of the image forming apparatus.
Figure 2:
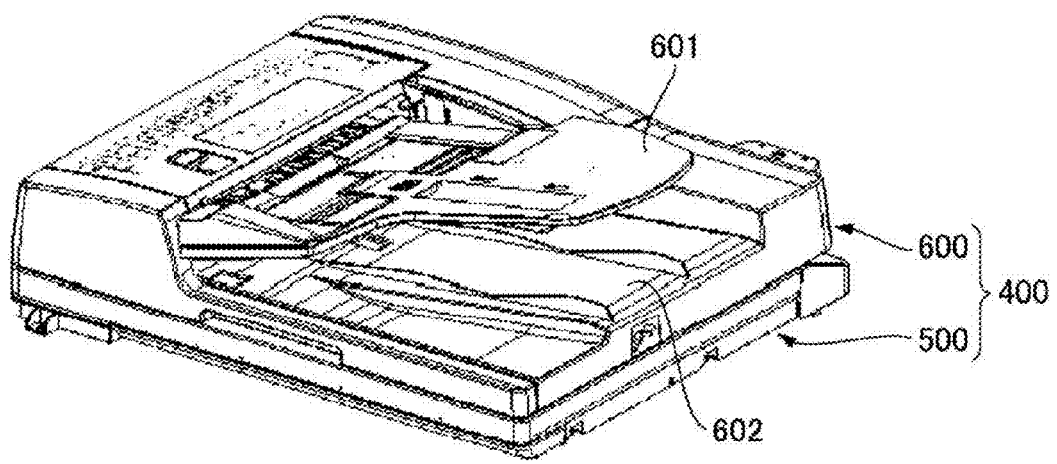
FIG. 2 is an external perspective view of an image reading apparatus of the image forming apparatus of FIG. 1.

FIG. 1 is a schematic sectional view of the image forming apparatus, which is taken along a sheet conveying direction of the image forming apparatus. FIG. 2 is an external perspective view of the image reading apparatus. An image forming apparatus 100 includes an apparatus main body 100A and an image reading apparatus 400 provided on the apparatus main body 100A. The image reading apparatus 400 includes an image reading unit 500 configured to read an image of a document placed on a platen glass 501 serving as a document placing portion, and an auto document feeder 600 serving as a document pressure unit configured to press the document, placed on the platen glass, against the platen glass. The auto document feeder 600 is pivotally supported on the image reading unit 500 by a support mechanism 300 described later so as to be openable and closable with respect to the platen glass. The auto document feeder 600 is configured to press the document against the platen glass in a closed state. The document pressed against the platen glass 501 is irradiated with light from an image reading unit 502 moving in a horizontal direction (sub-scanning direction) in FIG. 1 so as to be read by the image reading unit 502. This reading mode is referred to as a fixed reading mode.

Further, the auto document feeder 600 conveys a document S placed on a document stacking tray 601 to an image reading position on the platen glass 501, and then delivers the document S onto a document delivery tray 602. The image reading unit 500 is configured to read the document by causing the image reading unit stopped at the position illustrated in FIG. 1 to radiate the light onto the document being fed to the image reading position on the platen glass 501. This reading mode is referred to as a flow reading mode.

The apparatus main body 100A is configured to reproduce a document (forms an image of the document) on a sheet such as a sheet of plain paper and an OHP sheet based on image information from the image reading unit 500. In a lower portion of the apparatus main body 100A of the image forming apparatus 100, a plurality of sheet cassettes 111 (only one of which is shown and the others are not shown) which contain sheets P of various sizes are detachably mounted. A sheet conveyed from the sheet cassette 111 by a sheet feed conveying roller 105 is fed to a transfer position of a photosensitive drum 110 in an image forming portion 103. The photosensitive drum 110 is irradiated with a laser beam from a laser scanner 102 based on image information from the image reading apparatus 400 so that a latent image is formed on the photosensitive drum 110. Then, the latent image is developed with toner by a developing device (not shown) into a toner image. The toner image is transferred onto the sheet conveyed to the transfer position, and fixed by a fixing device 106.

In a case where the image needs to be formed on only one side of the sheet and needs not to be formed on both sides of the sheet, the sheet is delivered onto an internal delivery tray 112 by a delivery roller pair 109. In a case where images are formed on both sides of a sheet, a front surface and a back surface of the sheet is reversed by a switch-back conveyance and the sheet is conveyed along a re-feeding path 107 to the image forming portion 103 again. In the image forming portion 103, the toner image is transferred onto the back surface of the sheet and the toner image is fixed to the back surface by the fixing device 106. Then, the sheet is delivered onto the internal delivery tray 112 by the delivery roller pair 109. Note that, the sheets may be fed not only from the sheet cassettes 111 but also from a multipurpose tray 108.

As described above, the image reading apparatus 400 reads documents in one mode selected between the fixed reading mode and the flow reading mode by a user. However, the image reading apparatus according to the present invention may read documents at least in the fixed reading mode out of the fixed reading mode and the flow reading mode. Thus, as illustrated in FIG. 3A, instead of the auto document feeder 600 illustrated in FIGS. 1 and 2, a flat-plate-shaped opening and closing cover 2 configured to press a document against the platen glass 501 may be used as the document pressure unit, and the document pressure unit is not limited to the auto document feeder 600.

Now, an image reading apparatus 700 including the opening and closing cover 2 instead of the auto document feeder 600 will be described. Note that, the present invention is applicable also to the image reading apparatus 400 including the auto document feeder 600.

Figure 3A:
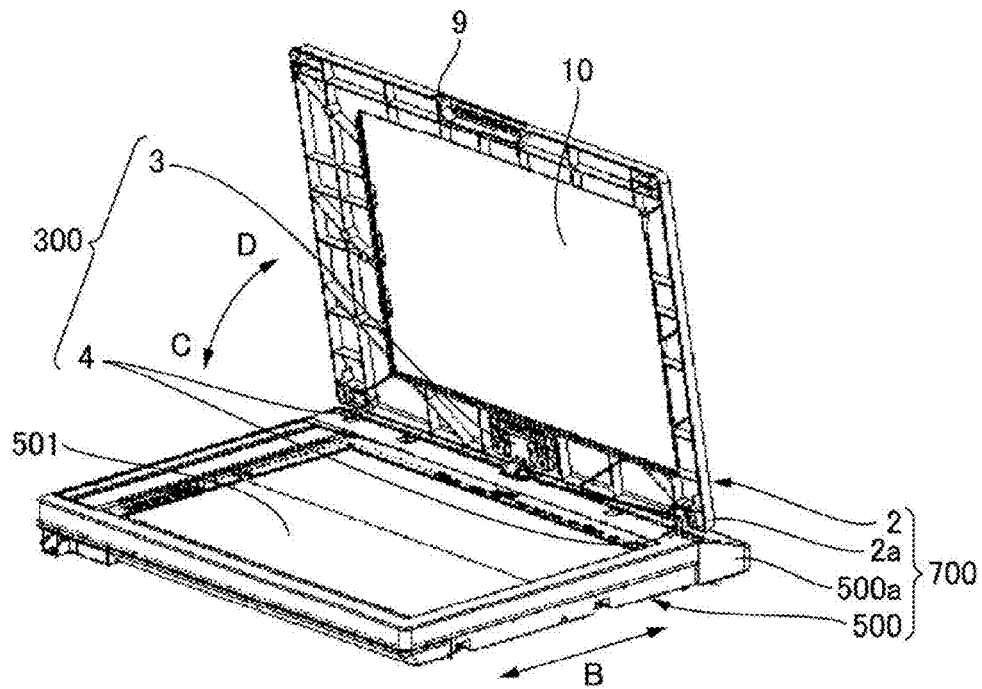
FIG. 3A is an external perspective view of the image reading apparatus in a state in which an opening and closing cover is opened.
Figure 3B:
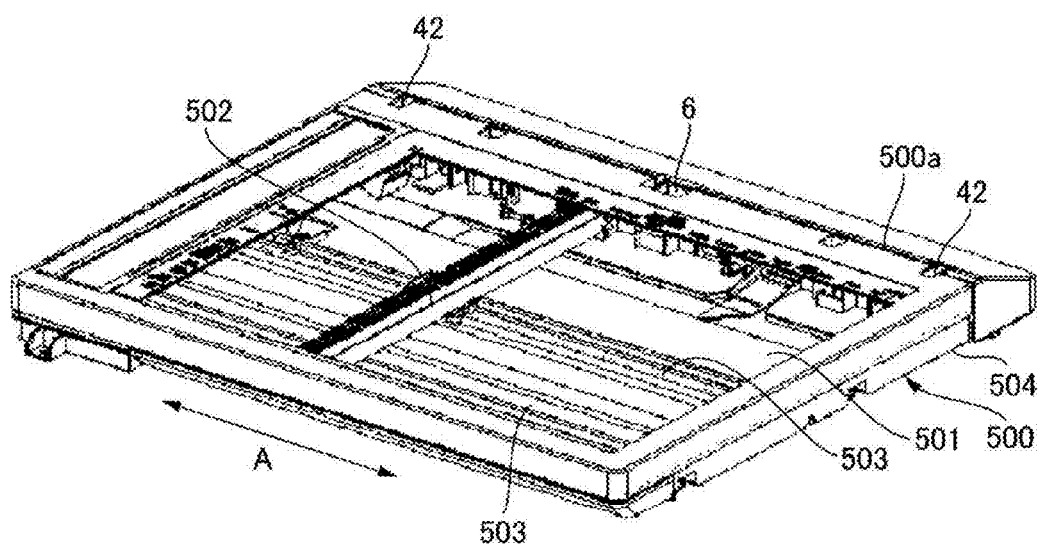
FIG. 3B is an external perspective view of an image reading unit.

FIG. 3A is an external perspective view of the image reading apparatus 700 in a state in which the opening and closing cover 2 is raised and opened. FIG. 3B is an external perspective view of the image reading unit 500. The opening and closing cover 2 includes a document cover 9 configured to cover the platen glass 501 and formed as an exterior, and a white plate 10 attached with an adhesive to a side of the document cover 9 facing the platen glass 501. The white plate 10 is provided on the document cover 9 through an elastic member such as sponge and rubber (not shown) so that the document can be pressed against the platen glass 501 by the elasticity of the elastic member.

The image reading unit 500 includes a box-shaped body 504 having an opened upper portion, the platen glass 501 provided on the opened upper portion of the body, and a pair of guide shafts 503 provided below the platen glass and extended in the horizontal direction (sub-scanning direction) A in the body 504. Further, the image reading unit 500 also includes the image reading unit 502 configured to read the document while being guided in the sub-scanning direction A by the guide shafts 503 in the fixed reading mode. In a far side portion 500a of the image reading unit 500, there are formed a hinge mounting hole 6 which is a vertical hole having a quadrangular shape in cross-section, to which an opening and closing hinge 3 described later is mounted, and slid surfaces 42 serving as receiving portions on which levers 41 of auxiliary hinges 4 described later (FIGS. 5A, 5B, 5C, 5D, 6A, 6B, 6C, and 6D) slide. The hinge mounting hole 6 is formed substantially at a center in the sub-scanning direction A of the far side portion 500a. The slid surfaces 42 are formed on both sides apart from each other in the sub-scanning direction A with respect to the hinge mounting hole 6. The image reading unit 500 is configured to read a document in the fixed reading mode by the image reading unit 502 which is guided in the sub-scanning direction A by the pair of guide shafts 503 after the user places the document on the platen glass 501 and closes the opening and closing cover 2. Note that, the image reading unit 502 is also configured to be stopped at the position illustrated in FIG. 1 and read documents in the flow reading mode.

The opening and closing cover 2 is provided so as to freely open and close with respect to the image reading unit 500 by cooperation of the single opening and closing hinge 3 serving as a first holding unit, which is positioned at the center in the sub-scanning direction A, and the auxiliary hinges 4 serving as a second holding unit, which are positioned on both the sides in the sub-scanning direction A with respect to the opening and closing hinge 3. In other words, the opening and closing hinge 3 and the auxiliary hinges 4 serve as the support mechanism 300 configured to support the opening and closing cover 2 in a pivotable manner with respect to the image reading unit 500, specifically, with respect to the platen glass 501.

Figure 4A:
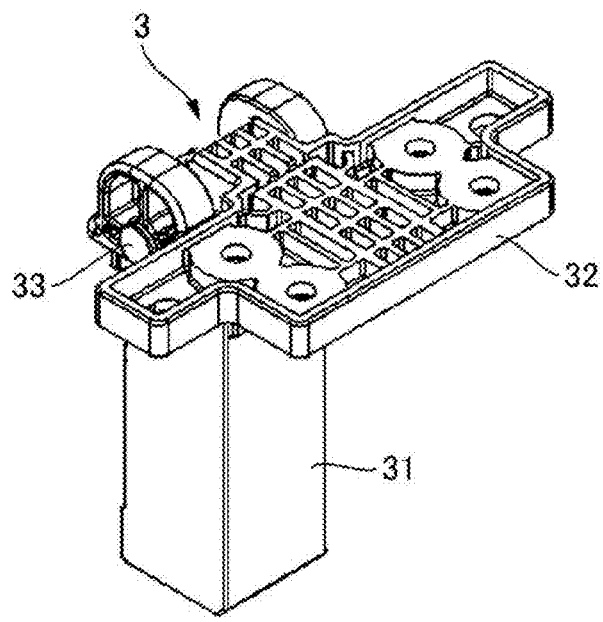
FIG. 4A is an external perspective view of a hinge in a state in which the opening and closing cover is closed.
Figure 4B:
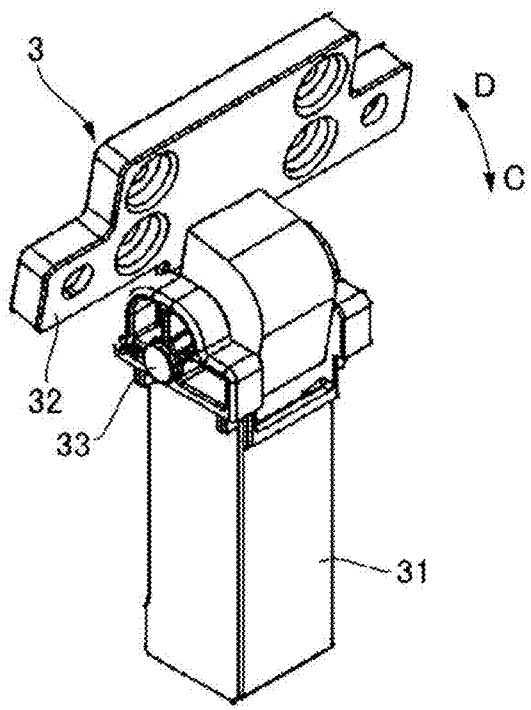
FIG. 4B is an external perspective view of the hinge in a state in which the opening and closing cover is opened.

In FIG. 3A, a coupling shaft 33 (FIGS. 4A and 4B) of the opening and closing hinge 3 described later connects, in a pivotally supporting manner, a far side portion 2a of the opening and closing cover 2 and the far side portion 500a of the image reading unit 500 to each other so that the opening and closing cover 2 can be opened and closed. The far side portions 2a and 500a refer to a far side with respect to a user standing in front of the image forming apparatus 100. In FIGS. 4A and 4B, the opening and closing hinge 3 includes a square shank-shaped supporting strut 31 to be fitted into the hinge mounting hole 6 which is the vertical hole having a quadrangular shape in cross-section in FIG. 3B, a hinge piece 32 to be fixed to the opening and closing cover 2 by screws, and the coupling shaft 33 configured to couple the supporting strut 31 and the hinge piece 32 to each other in a pivotable manner. The hinge piece 32 is configured to pivot in a closing direction C and an opening direction D about the coupling shaft 33 with respect to the supporting strut 31. Note that, there is provided a stopper (not shown) configured to prevent the opening and closing hinge 3 in the state of FIG. 4B from pivoting further in the opening direction D. Thus, the opening and closing cover 2 in the state of FIG. 3A is prevented from being tilted further rearward.

Figure 5A:
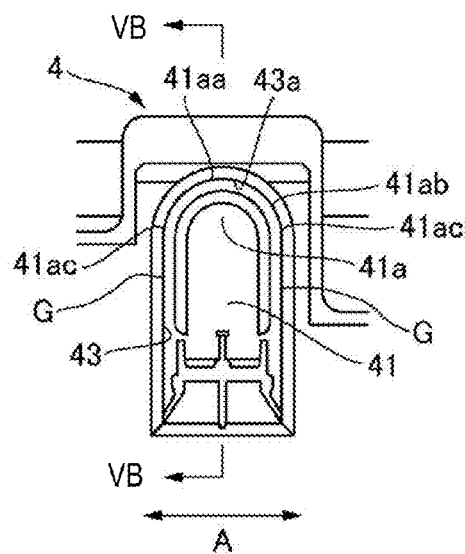
FIG. 5A is a sectional view taken along the line VA-VA in FIG. 5B, for illustrating an auxiliary hinge when the opening and closing cover is closed.
Figure 5B:
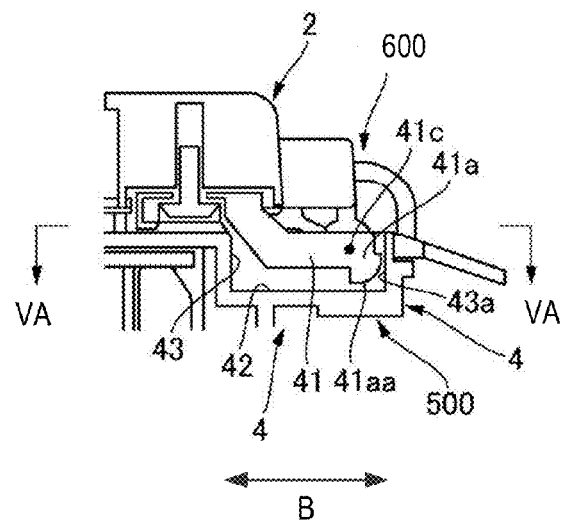
FIG. 5B is a sectional view taken along the line VB-VB in FIG. 5A.
Figure 5C:
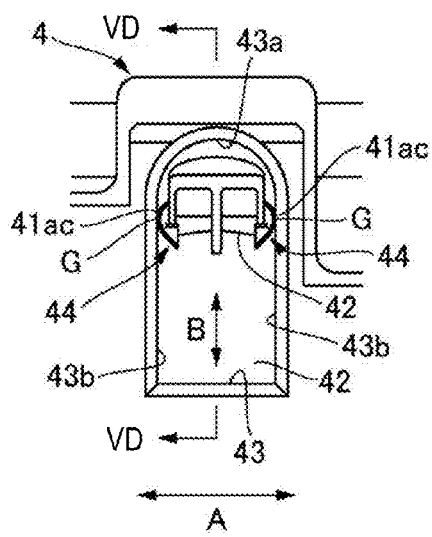
FIG. 5C is a sectional view taken along the line VC-VC in FIG. 5D, for illustrating the auxiliary hinge when the opening and closing cover is opened.

FIGS. 5A, 5B, 5C, and 5D are detail views of the auxiliary hinge 4. FIGS. 6A and 6B are views of the slid surface 42 of the auxiliary hinge 4. FIGS. 6C and 6D are views of the lever 41. The auxiliary hinges 4 each include the slid surface 42 formed in an upper portion of the far side portion 500a of the image reading unit 500, and the lever 41 provided in the far side portion of the opening and closing cover 2. The lever 41 is configured to abut against the slid surface 42 so that the opening and closing cover 2 during opening or closing is supported by the lever 41 on the image reading unit 500. Thus, unlike the opening and closing hinge 3, the auxiliary hinge 4 does not include a coupling shaft. The auxiliary hinge 4 holds the opening and closing cover 2 so that the opening and closing cover 2 can be opened and closed with respect to the platen glass 501 without supporting the image reading unit 500 by a shaft.

Figure 5D:
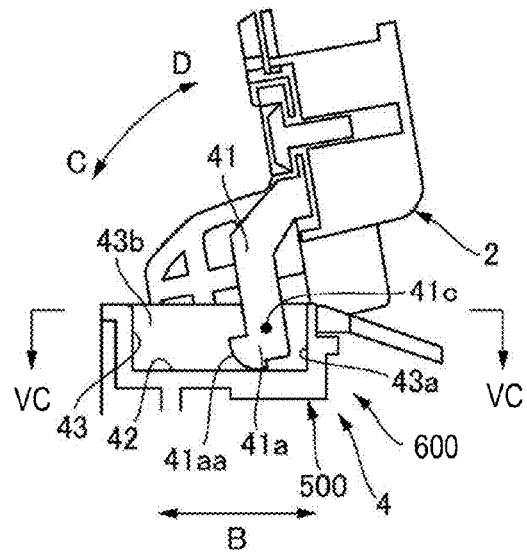
FIG. 5D is a sectional view taken along the line VD-VD in FIG. 5C.
Figure 6A:
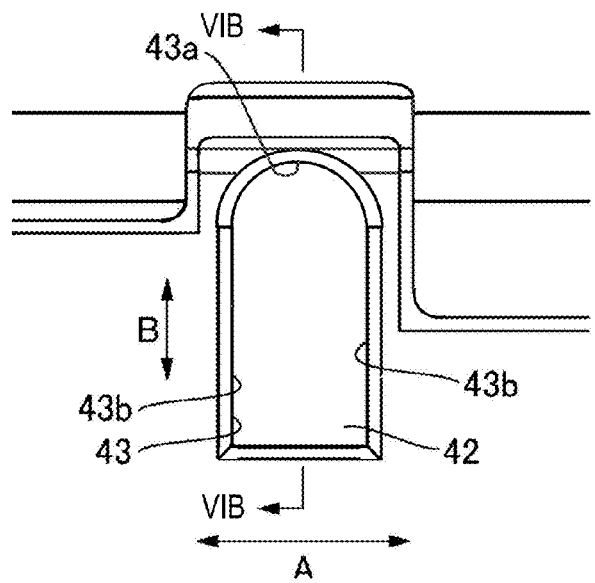
FIG. 6A is a plan view of a recessed portion in which a slid surface is formed.
Figure 6B:
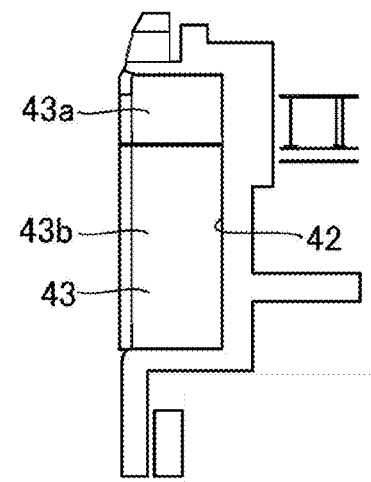
FIG. 6B is a sectional view taken along the line VIB-VIB in FIG. 6A.
Figure 6C:
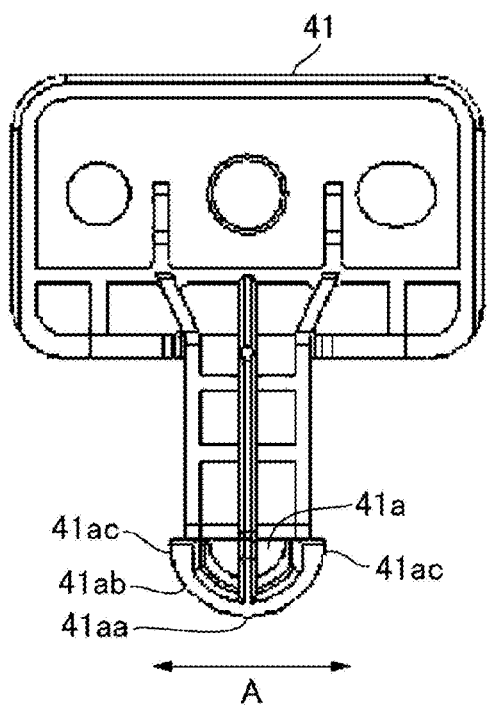
FIG. 6C is a plan view of a lever.
Figure 6D:
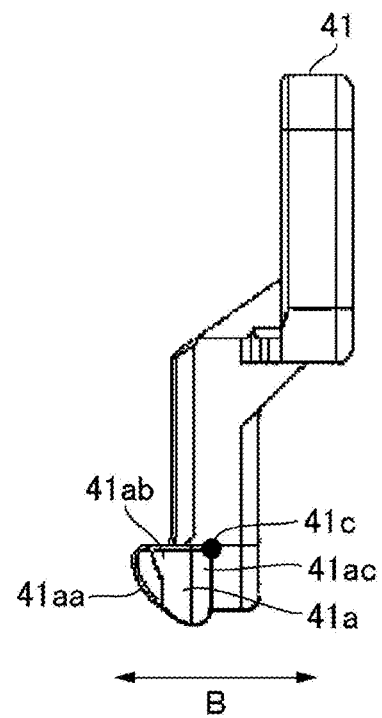
FIG. 6D is a side view of the lever.

As illustrated in FIGS. 3A and 5D, the lever 41 is configured to pivot together with the opening and closing cover 2 in a main scanning direction B orthogonal to the sub-scanning direction A in conjunction with user's operation of raising and opening the opening and closing cover 2. Therefore, the lever 41 is oriented downward. Further, as illustrated in FIG. 5B, the lever 41 is configured to be substantially parallel to a surface of the platen glass 501 in conjunction with user's operation of tilting and closing the opening and closing cover 2 to a near side. As illustrated in FIG. 5B, the lever 41 enters a recessed portion 43 provided in the far side portion 500a of the image reading unit 500 and elongated along the main scanning direction B. A bottom surface of the recessed portion 43 is formed as the flat slid surface 42. A distal end portion (pivot base end portion) of the lever 41 serves as a sliding portion 41a which is brought into slide contact with the slid surface 42 serving as a placing portion. As illustrated in FIGS. 5B, 5D, 6A, and 6D, in the sliding portion 41a, a circular-arc surface 41aa configured to slide on the slid surface 42 in conjunction with opening and closing of the opening and closing cover 2 is formed along the main scanning direction B. A center 41c (FIG. 5D, FIG. 6D) of curvature of the circular-arc surface 41aa is concentric with the coupling shaft 33 (FIGS. 4A and 4B) serving as a pivot center of the opening and closing hinge 3. In other words, the center 41c of curvature of the circular-arc surface 41aa is positioned coaxially with the coupling shaft 33 of the opening and closing hinge 3. Further, as illustrated in FIGS. 5A, 6C, and 6D, in the sliding portion 41a, a circular-arc surface 41ab is formed along the sub-scanning direction A. Terminal ends of the circular-arc surface 41ab form projecting portions 41ac projecting to both sides in the sub-scanning direction A of the lever 41.

As illustrated in FIGS. 5A, 5C, 6A, and 6B, a circular-arc recessed surface 43a is formed in a far side portion of the recessed portion 43. Further, in the recessed portion 43, a pair of side walls 43b is formed along the main scanning direction B.

As illustrated in FIG. 5D, the circular-arc surface 41aa of the lever 41 of the auxiliary hinge 4 enters the recessed portion 43 and a part of the circular-arc surface 41aa abuts against the slid surface 42 so as to support the opening and closing cover 2 with respect to the image reading unit 500 cooperatively with the opening and closing hinge 3. The auxiliary hinges 4 are provided on both the sides with respect to the opening and closing hinge 3, and hence the opening and closing cover 2 is prevented from being inclined in the sub-scanning direction A. Further, the pair of projecting portions 41ac of the lever 41 respectively face the pair of side walls 43b of the recessed portion 43 with slight gaps G (FIG. 5C) between the projecting portions 41ac and the side walls 43b. In this connection, the gaps G each may be from 0.1 mm to 0.2 mm. With this, the projecting portions 41ac of the lever 41 and the side walls 43b of the recessed portion 43 serve as receptive stoppers 44 serving as movement preventing portions so as to prevent the opening and closing cover 2 from moving in the sub-scanning direction A (a direction of a pivotal axis of the opening and closing hinge 3).

In this state, when the opening and closing cover 2 is tilted to the near side (tilted in the closing direction C), the opening and closing cover 2 pivots about the opening and closing hinge 3 and the auxiliary hinges 4 of the support mechanism 300 as a pivot center. At this time, the sliding portion 41a of the lever 41 slides on the slid surface 42. Each of the levers 41 and a component of the image reading unit 500 in which the slid surfaces 42 are formed is a molded product of a synthetic resin such as POM (polyoxymethylene) having a small friction coefficient. Thus, the lever 41 smoothly slides on the slid surface 42, and hence the opening and closing cover 2 is swiftly closed. Further, during a pivotal movement of the opening and closing cover 2, the projecting portions 41ac on both the sides of the lever 41 and the side walls 43b of the recessed portion 43 face each other. Thus, the opening and closing cover 2 is prevented from moving in the sub-scanning direction A. As a result, the document placed on the platen glass 501 can be reliably pressed by the opening and closing cover 2 without being displaced on the platen glass 501.

When the opening and closing cover 2 is closed, as illustrated in FIGS. 5A and 5B, the circular-arc surface 41aa of the lever 41 abuts against the circular-arc recessed surface 43a of the recessed portion 43. Further, the auxiliary hinges 4 are provided on both the sides with respect to the opening and closing hinge 3, and the circular-arc surfaces 41ab of the levers 41 abut against the circular-arc recessed surfaces 43a of the recessed portions 43 on both the sides of the opening and closing hinge 3. Thus, the auxiliary hinges 4 prevent the opening and closing cover 2 from being rotated and displaced on the platen glass 501 in the state in which the opening and closing cover 2 covers the platen glass 501. With this, the document placed on the platen glass 501 can be reliably pressed by the opening and closing cover 2 without being displaced on the platen glass 501.

Figure 7A:
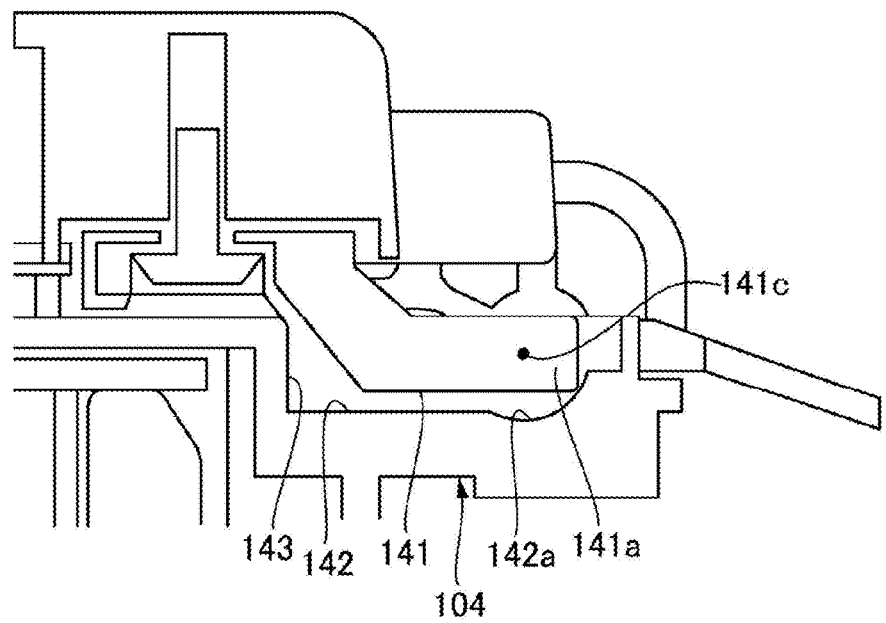
FIG. 7A is a view corresponding to FIG. 5B, for illustrating an auxiliary hinge according to another embodiment of the present invention.
Figure 7B:
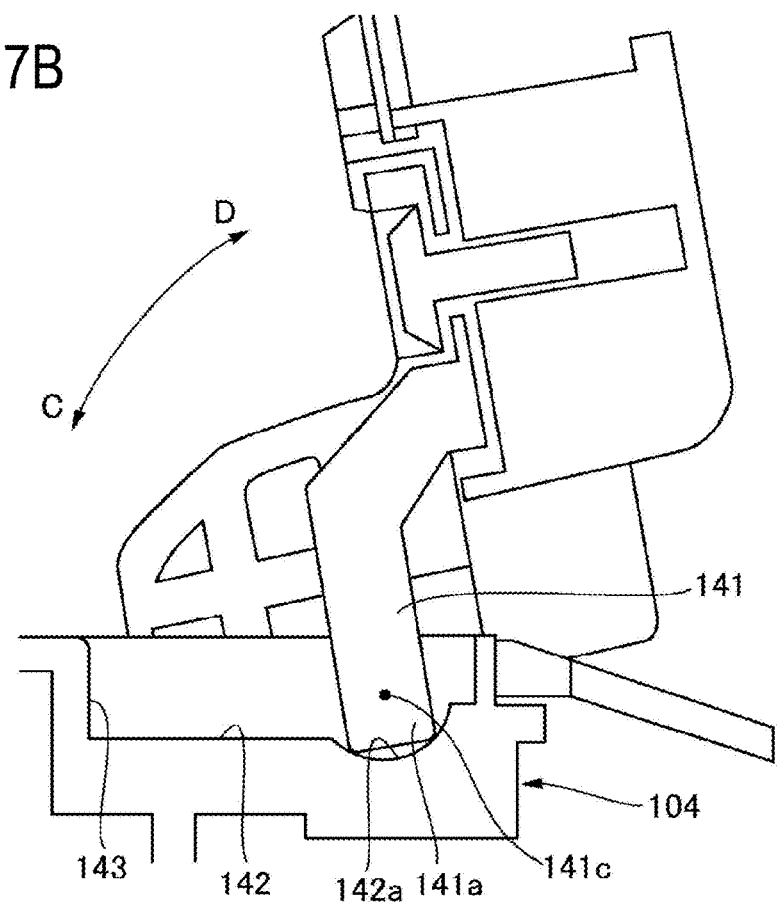
FIG. 7B is a view corresponding to FIG. 5D, for illustrating the auxiliary hinge of FIG. 7A.

Unlike the above description in which the circular-arc surface 41aa is formed on the lever 41, a concaved circular-arc surface 142a may be formed in a slid surface 142 serving as a receiving portion of a recessed portion 143 without a circular-arc surface formed on a sliding portion 141a of a lever 141 as in an auxiliary hinge 104 illustrated in FIGS. 7A and 7B, which serves as the second holding unit. A center 141c of curvature of the circular-arc surface 142a in this case is also concentric with the coupling shaft 33 serving as the pivot center of the opening and closing hinge 3. In other words, the center 141c of curvature of the circular-arc surface 142a is positioned coaxially with the coupling shaft 33 of the opening and closing hinge 3. Further, although not shown in the drawings, the circular-arc surfaces may be formed on both the sliding portion of the lever and the slid surface. Thus, the circular-arc surface only needs to be formed on at least one of the sliding portion and the slid surface serving as the placing portion, which abut against each other. In this case, regardless of whether the circular-arc surface is formed on the sliding portion or the slid surface serving as the placing portion, the center of curvature of the circular-arc surface needs to be concentric with the pivot center of the opening and closing hinge 3. In other words, the center of curvature of the circular-arc surface is positioned coaxially with the pivot center of the opening and closing hinge 3.

Figure 8A:
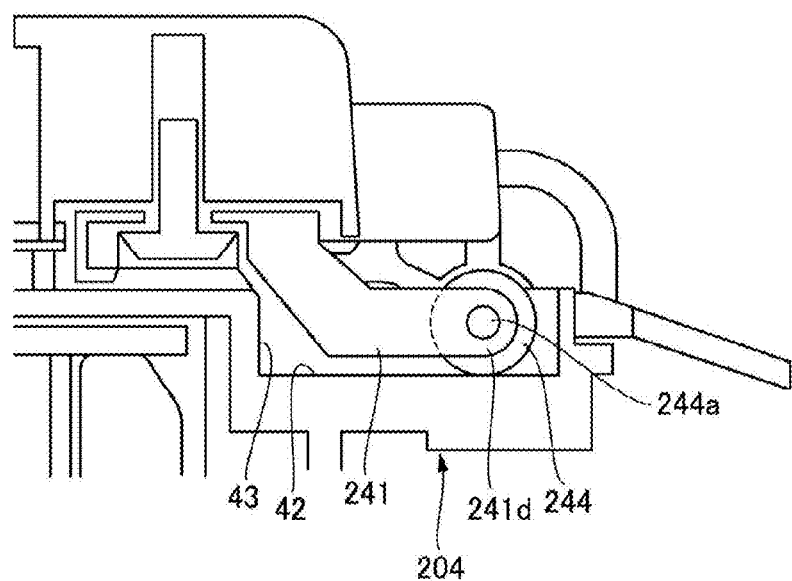
FIG. 8A is a view corresponding to FIG. 5B, for illustrating an auxiliary hinge according to still another embodiment of the present invention.
Figure 8B:
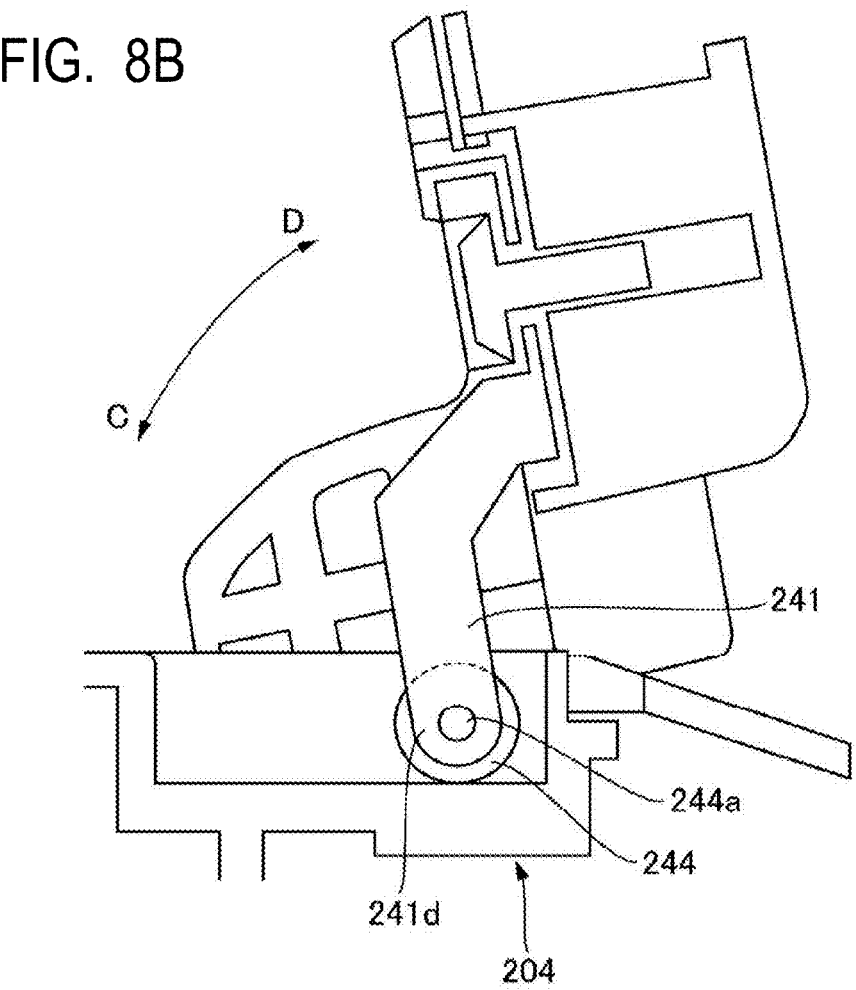
FIG. 8B is a view corresponding to FIG. 5D, for illustrating the auxiliary hinge of FIG. 8A.

Further, as in an auxiliary hinge 204 illustrated in FIGS. 8A and 8B, which serves as the second holding unit, the circular-arc surface needs not be formed on a lever 241, and a roller 244 serving as a rotary portion may be provided on a distal end portion (pivot base end portion) 241d. In this case, a rotary shaft 244a of the roller 244 and the coupling shaft 33 of the opening and closing hinge 3 need to be concentric with each other. In other words, the rotary shaft 244a of the roller 244 is positioned coaxially with the coupling shaft 33 of the opening and closing hinge 3.

Figure 9A:
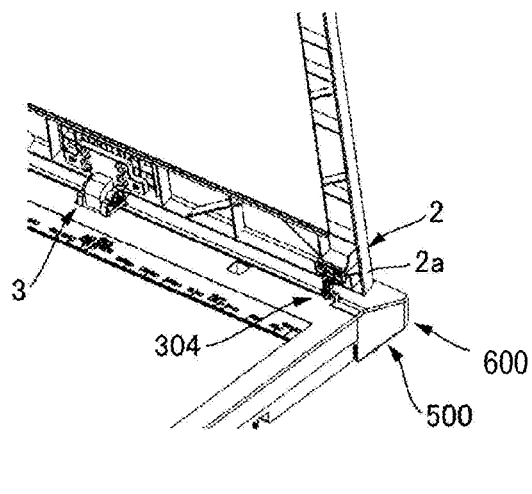
FIG. 9A is a perspective view of an auxiliary hinge and a hinge according to yet another embodiment of the present invention when the opening and closing cover is opened.
Figure 9B:
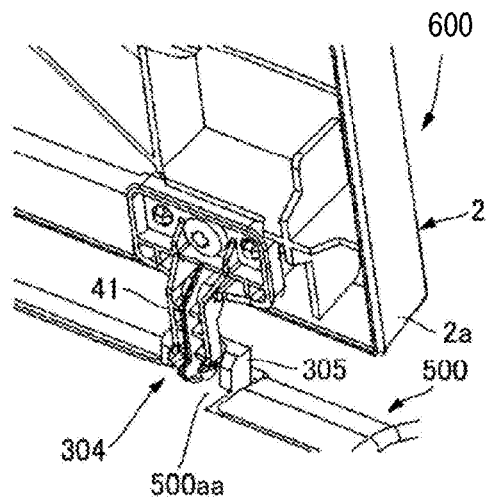
FIG. 9B is an enlarged view of the auxiliary hinge of FIG. 9A.
Figure 9C:
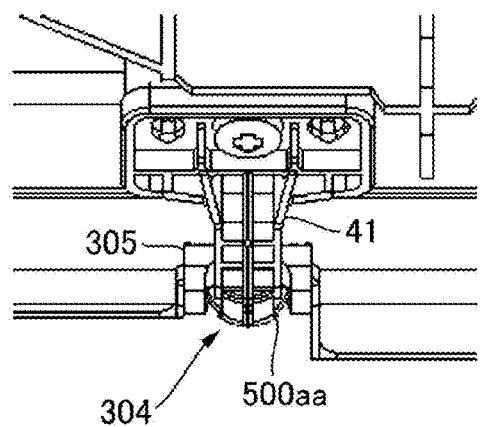
FIG. 9C is a view of the auxiliary hinge of FIG. 9B as viewed from a front side.

Still further, the slid surface 42 needs not be formed in the recessed portion 43, and, as in an auxiliary hinge 304 illustrated in FIGS. 9A, 9B, and 9C, which serves as the second holding unit, a flat upper surface 500aa itself of the far side portion 500a of the image reading unit 500 may be used as the slid surface. In this case, the lever 41 has the same shape as that of the lever 41 illustrated in FIGS. 6C and 6D. Further, portions corresponding to the circular-arc recessed surface 43a and the pair of side walls 43b illustrated in FIG. 5C, respectively, are formed in a receiving member 305, having a shape of a square bracket as viewed in a plan view, projecting from the far side portion 500a of the image reading unit 500.

Figure 10:
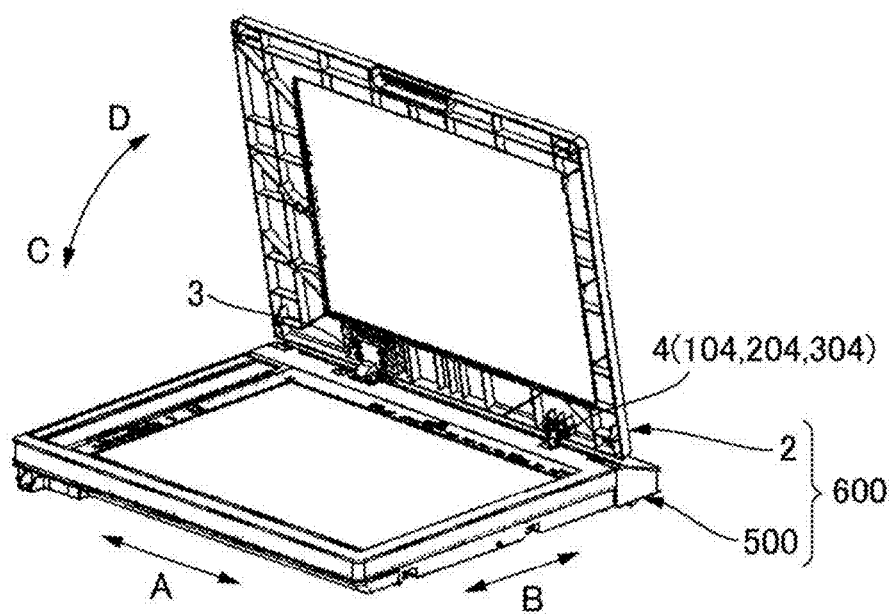
FIG. 10 is an external perspective view corresponding to FIG. 3A, for illustrating an image reading apparatus including a single hinge and a single auxiliary hinge.

Yet further, in the above description, the auxiliary hinges 4, 104, 204, and 304 are each provided in a pair on both the sides with respect to the opening and closing hinge 3. However, as illustrated in FIG. 10, a single opening and closing hinge 3 and a single auxiliary hinge 4 (104, 204, or 304) may be arranged apart from each other in the sub-scanning direction A.

In the image reading apparatus described above, at least one remains a conventional opening and closing hinge of a plurality of opening and closing hinges which are used in the conventional art for supporting the auto document feeder or the opening and closing cover in a pivotable manner with respect to the image reading unit and the other one is configured to abut against the image reading unit to support the auto document feeder or the opening and closing cover. In this way, the image reading apparatus 400 and 700 each have such a simple structure that the auto document feeder 600 or the opening and closing cover 2 is supported in a pivotable manner with respect to the image reading unit 500. Thus, the structure or assembly can be simplified, which leads to cost reduction. Further, the auto document feeder or the opening and closing cover is held in abutment against and supported with respect to the image reading unit. Thus, when the document is thick, the part that is held in abutment and supported is raised. With this, the document can be brought into close contact with the image reading unit with the auto document feeder or the opening and closing cover. As a result, the reading accuracy can be enhanced. In addition, cost of an image forming apparatus including the image reading apparatus having such a structure also can be reduced.

According to the image reading apparatus of the embodiments, even when a number of opening and closing hinges is reduced, the opening and closing cover can be easily opened and closed. Thus, significant cost reduction can be achieved without deterioration in functionality or product quality of the opening and closing cover.

The image forming apparatus according to the embodiments includes the image reading apparatus having the simplified structure. Thus, the entire apparatus can be simplified.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-227763, filed Oct. 31, 2013, which is hereby incorporated by reference herein in its entirety.

What is claimed is:
1. An image reading apparatus, comprising:
an image reading unit configured to read an image of a document placed on a document placing portion;
a document pressure unit configured to press the document placed on the document placing portion against the document placing portion;
a first holding unit configured to hold the document pressure unit so that the document pressure unit is openable and closable with respect to the document placing portion with a shaft pivotally supporting the document pressure unit; and
a second holding unit configured to hold the document pressure unit in cooperation with the first holding unit so that the document pressure unit is openable and closable with respect to the document placing portion without a shaft pivotally supporting the document pressure unit,
wherein the second holding unit pivots in conjunction with opening and closing of the document pressure unit, and a pivot center of the second holding unit is substantially positioned coaxially with a pivot center of the first holding unit.

2. An image reading apparatus according to claim 1, wherein the second holding unit comprises:
a sliding portion provided on the document pressure unit; and
a receiving portion provided on the image reading unit and configured to allow the sliding portion to slide so that the document pressure unit is openable and closable with respect to the document placing portion.

3. An image reading apparatus according to claim 1, wherein the first holding unit comprises:
a fixed portion fixed to the document pressure unit;
a fitted portion fitted to the image reading unit; and
a coupling shaft configured to couple the fixed portion and the fitted portion in a pivotable manner,
and wherein the second holding unit comprises:
a rotary portion provided on the document pressure unit; and
a receiving portion provided on the image reading unit and configured to receive the rotary portion so that the document pressure unit is openable and closable with respect to the document placing portion, and wherein a rotation center of the rotary portion is substantially positioned coaxially with the coupling shaft.

4. An image reading apparatus according to claim 1, further comprising a movement preventing portion provided on each side of the second holding unit and configured to prevent the document pressure unit from moving in a direction of the shaft of the first holding unit.

5. An image forming apparatus, comprising:
an image reading apparatus as recited in claim 1; and
an image forming unit configured to form an image, read by the image reading apparatus, on a sheet.

6. An image reading apparatus according to claim 2, wherein the first holding unit comprises:
a fixed portion fixed to the document pressure unit;
a fitted portion fitted to the image reading unit; and
a coupling shaft configured to couple the fixed portion and the fitted portion in a pivotable manner,
wherein at least one of the sliding portion and the receiving portion comprises a circular-arc surface, and
wherein a center of curvature of the circular-arc surface is substantially positioned coaxially with the coupling shaft.

7. An image reading apparatus according to claim 1, further comprising a third holding unit different from the second holding unit and configured to hold the document pressure unit so that the document pressure unit is openable and closable with respect to the document placing portion without a shaft pivotally supporting the document pressure unit,
wherein the first holding unit is provided between the second folding unit and the third holding unit.

8. An image reading apparatus, comprising:
an image reading unit configured to read an image of a document placed on a document placing portion;
a document pressure unit configured to press the document placed on the document placing portion against the document placing portion;
a first holding unit configured to hold the document pressure unit so that the document pressure unit is openable and closable with respect to the document placing portion with a shaft pivotally supporting the document pressure unit; and
a second holding unit configured to hold the document pressure unit so that the document pressure unit is openable and closable with respect to the document placing portion without a shaft pivotally supporting the document pressure unit,
wherein the second holding unit holds the document pressure unit in cooperation with the first holding unit in a state in which the second holding unit is subjected to a load of the document pressure unit while the document pressure unit pivots in an opening direction of the document pressure unit.

9. An image reading apparatus according to claim 8, wherein the second holding unit comprises:
a sliding portion provided on the document pressure unit; and
a receiving portion provided on the image reading unit and configured to allow the sliding portion to slide so that the document pressure unit is openable and closable with respect to the document placing portion.

10. An image reading apparatus according to claim 9, wherein the first holding unit comprises:
a fixed portion fixed to the document pressure unit;
a fitted portion fitted to the image reading unit; and
a coupling shaft configured to couple the fixed portion and the fitted portion in a pivotable manner,
wherein at least one of the sliding portion and the receiving portion comprises a circular-arc surface, and
wherein a center of curvature of the circular-arc surface is substantially positioned coaxially with the coupling shaft.

11. An image reading apparatus according to claim 8, wherein the first holding unit comprises:
a fixed portion fixed to the document pressure unit;
a fitted portion fitted to the image reading unit; and
a coupling shaft configured to couple the fixed portion and the fitted portion in a pivotable manner,
and wherein the second holding unit comprises:
a rotary portion provided on the document pressure unit; and
a receiving portion provided on the image reading unit and configured to receive the rotary portion so that the document pressure unit is openable and closable with respect to the document placing portion, and
wherein a rotation center of the rotary portion is substantially positioned coaxially with the coupling shaft.

12. An image reading apparatus according to claim 8, further comprising a movement preventing portion provided on each side of the second holding unit and configured to prevent the document pressure unit from moving in a direction of the shaft of the first holding unit.

13. An image reading apparatus according to claim 8, further comprising a third holding unit different from the second holding unit and configured to hold the document pressure unit so that the document pressure unit is openable and closable with respect to the document placing portion without a shaft pivotally supporting the document pressure unit,
wherein the first holding unit is provided between the second folding unit and the third holding unit.

14. An image forming apparatus, comprising:
an image reading apparatus as recited in claim 8; and
an image forming unit configured to form an image, read by the image reading apparatus, on a sheet.

* * * * *